March 30, 1943.  H. NUTT  2,314,948
TORSIONAL VIBRATION DAMPENER
Filed April 10, 1941
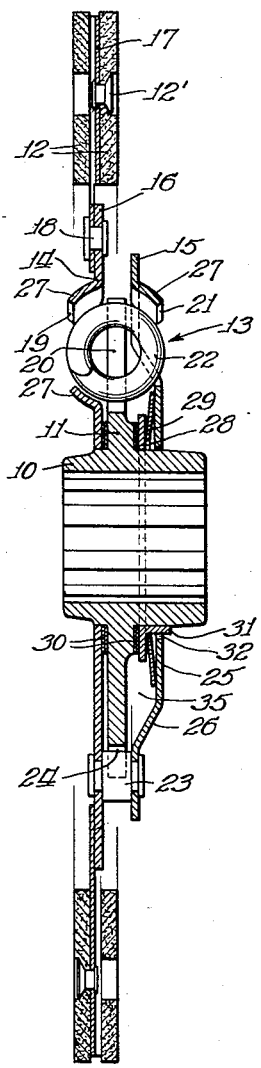
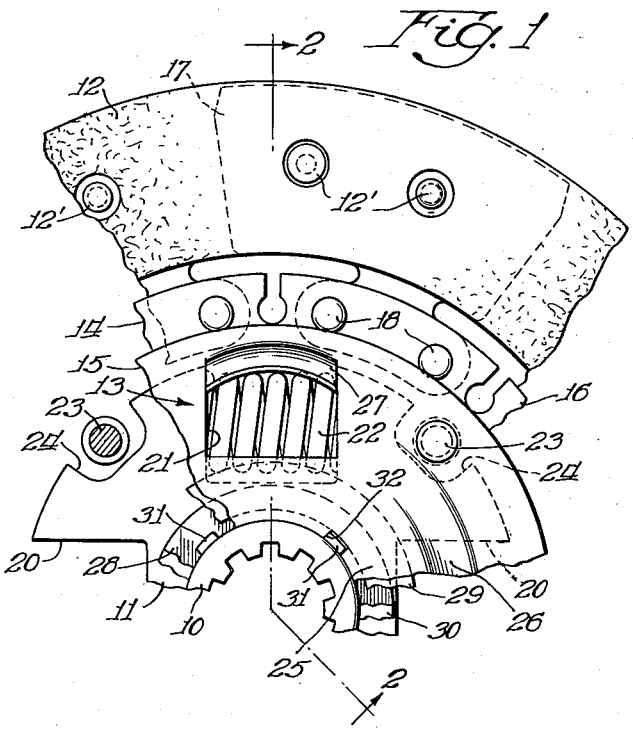
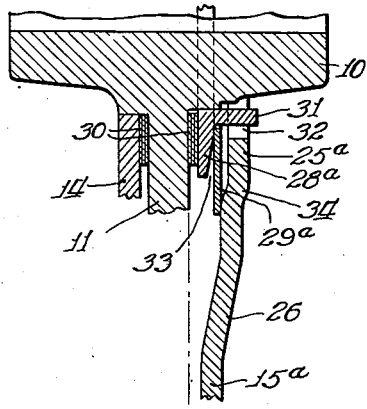
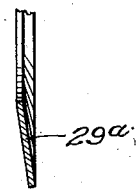
Inventor:
Harold Nutt
By: Edward C. Gritzbaugh
Atty Patented Mar. 30, 1943

2,314,948

UNITED STATES PATENT OFFICE 2,314,948

TORSIONAL VIBRATION DAMPENER

Harold Nutt, Chicago, Ill., assignor to Borg-Warner Corporation, Chicago, Ill., a corporation of Illinois Application April 10, 1941, Serial No. 387,801

10 Claims. (Cl. 192—68)

This invention relates to friction clutch plates and has as its object to provide in a clutch plate a novel and improved torque cushioning mechanism of the type embodying coil springs for cushioning the transmission of load between the hub and facing mounting disc, and braking means for dampening the vibrations tending to be set up in the cushioning means.

In the conventional clutch plate of this type, the load on the friction elements of the braking means is obtained by tying the spring housing plates together under distortion. While this method is reasonably satisfactory, it does not provide for complete accuracy of control of the load. Slight variations in the dimensions of the parts may change the load on the friction members to a considerable extent. The primary object of the present invention is to provide, in a vibration dampener of the type under consideration, an arrangement which will meet an increasing demand for extreme accuracy in load control on the friction elements, a problem which has produced considerable difficulty.

More specifically, the invention contemplates an arrangement wherein accuracy may be maintained in the face of manufacturing variations. To this end, the invention contemplates an arrangement in which the load on the friction elements of the braking means is provided by a Belleville washer type spring proportioned to produce an adequate load as for example 65 lbs. which will remain substantially constant throughout a range of as much as ³⁄₆₄" variation in the spacing of the parts between which the spring acts.

Another object of the invention is to eliminate or greatly decrease changes in load on the friction surfaces of the dampening washers as a result of wear of the mating members.

Another object of the invention is to provide a friction clutch plate incorporating torque cushioning mechanism comprising cushioning springs, spring housing means and braking means in a compact and relatively simple and inexpensive arrangement. To this end, the braking means is disposed adjacent the hub of the clutch plate, in an annular space lying radially inwardly of the springs, and acting between one of the spring housing plates and the hub flange. Friction is applied by a plurality of thin washers in series which, after a short period of wearing in, give a highly uniform frictional engagement. The spring load is applied to the washers by a pressure plate, the spring being interposed between the pressure plate and the adjacent cushion spring housing plate.

Other specific objects of the invention are to provide a driving connection between the pressure plate and the adjacent cushion spring housing plate, simply and compactly arranged with reference to the washer spring, and to provide for fulcruming contact of the inner and outer edges of the washer spring with the pressure plate and cushion spring housing plate respectively such as to maintain substantially constant fulcrum radii irrespective of variations in the axial spacing of the two plates.

Fig. 1 is an elevation of a portion of a clutch plate embodying the invention;

Fig. 2 is a sectional view through the center of the plate taken as indicated by the line 2—2 of Fig. 1;

Fig. 3 is a detailed sectional view of the braking mechanism of a modified form of the invention; and Fig. 4 is a detailed sectional view of a portion of the washer spring employed in the Fig. 3 form of the invention, the spring being shown in its unstressed state.

As an example of one form in which the invention may be embodied, I have illustrated in the drawing a clutch plate which is general is a conventional design, including a hub 10 having a radial flange 11. A pair of annular friction facings 12 are connected to the hub 10 through the medium of vibration dampening mechanism indicated generally at 13, said mechanism including a pair of cushioning spring housing plates 14 and 15, the former being extended as at 16 to form a facing mounting disc. The facings 12 are secured as by means of rivets 12' to facing cushions 17 which in turn are secured as by means of rivets 18 to the mounting disc 16.

The spring housing plates 14 and 15 and the flange 11 are provided with registering openings 19, 20 and 21 respectively in which are received the cushioning springs 22. In the plate shown, there are four of the springs equi-distantly spaced around the circumference of the plate. Collectively, the springs form a sectional spring cushion between the hub and the housing plates 14, 15, the ends of the springs being engaged against the edges defining the openings 19, 20 and 21. As will be noted, the openings 20 are in the form of open notches, the term "openings" being used in a broad sense. The plates 14 and 15 are formed with spring cage members 27 which define radial extremities of the openings 19 and 21.

The housing plates 14 and 15 are tied together rigidly by rivets 23 which extend through notches 24 in the periphery of the flange 11, being spaced from the ends of the notches to permit a limited amount of oscillation between the hub and the plates 14, 15 and adapted upon contact with said ends of the notches to form a positive drive connection between the hub and the plates 14, 15, limiting the amplitude of cushioning oscillation.

The inner region 25 of one of the spring housing plates as for example, the plate 15, is offset axially from the plane of the outer region, as at 26, to provide an axially enlarged annular space 35 lying radially inwardly of the springs 22 and encompassed between the plane of the flange 11 and of the side limits of the springs 22 and cage members 27. The annular space 35 accommodates a pressure plate 28 and a washer spring 29.

Interposed between the housing plate 14 and one side of the flange 11 and in the space 35 on the other side of the flange 11, are two sets of thin steel washers 30, each set comprising a plurality of washers in series. It has been found that by employing three washers in each set as shown in Fig. 3, three pairs of effective friction faces are provided and the maximum amount of travel between each pair of faces is only one-third that which would be necessary if only one pair of friction faces were provided. After a short preliminary period of wearing in, the friction surfaces thus provided will maintain a relatively high uniformity of frictional engagement, under a substantially constant load.

The spring 29, of the Belleville washer type, provides such constant load, as for example 65 lbs., without substantial change under a variation of as high as 5/64" in the spacing between the plate member 15 and the flange 11 under the effect of wear between the friction surfaces.

The pressure plate 28 is provided with a lug or series of lugs 31 projecting through a notch or notches 32 in the inner region 25 of the housing plate 15 to form a driving connection between the pressure plate and the spring housing plate permitting axial adjustment of the pressure plate against the friction washers 30.

In the form of the invention shown in Figure 3, additional axial compactness is secured by stressing the spring 29a from its normal conical shape shown in Figure 4 to a substantially flat plane as shown in Figure 3. Substantially constant radii of fulcruming contact between the spring and the plates 28a and 15a is obtained by relieving the plate 28a as at 33 and by forming an offset 34 in the inner region 25a of the plate 15a.

The lugs 31 extend through the open center of the spring washer 29 or 29a thus providing a compact arrangement.

I claim:

1. A friction clutch including a hub having a radial flange, a facing supporting disc associated with one side of said flange, a spring housing plate on the other side of said flange, said disc, plate and flange being provided with registering openings, springs seated in said openings and forming collectively a sectional cushion between the hub and said disc, a braking ring interposed between said plate and flange, and a washer spring serving to develop braking action between said braking ring and flange, said braking ring and washer spring being coaxial with and accommodated in the space radially inwardly of said springs.

2. In a friction clutch, a hub having a radial flange, a pair of annular spring housing plates embracing said flange and oscillatable on said hub, said flange and plates having registering openings, springs seated in said openings and collectively forming a sectional cushion between the hub and said plates, means tying said plates together in rigid association with each other, and a washer spring interposed between one of said plates and said flange and serving to develop braking action between the other of said plates and said flange, said washer spring being coaxial with and accommodated within the space lying radially inwardly of said springs.

3. In a friction clutch, a hub having a radial flange, a pair of annular spring housing plates embracing said flange and oscillatably receiving said hub, said plates and flange having registering openings, springs seated in said openings and collectively forming a sectional cushion between said hub and plates, means tying said plates together in rigid association with each other, one of said plates having an outer region lying close to said flange and an inner region offset axially away from said flange to define an annular space lying radially inwardly of said springs and between said flange and said one plate, a friction washer, a pressure plate, and a washer spring encircling said hub in said annular space and interposed in the order named between said flange and said one plate, said washer spring serving to urge said pressure plate against said friction washer to develop braking action between said pressure plate and said flange.

4. In a friction clutch, a hub having a radial flange, a pair of annular spring housing plates receiving said hub and embracing said flange, said plates and flange having registering openings, springs seated in said openings and collectively forming a sectional cushion between said hub and plates, means tying said plates together in rigid association with each other, an annular pressure plate interposed between one of said housing plates and said flange, and a spring washer interposed between said pressure plate and said one housing plate and serving to develop braking action between said pressure plate and flange, said pressure plate having a driving lug extending axially through the central opening of said washer and interengaging with said one housing plate.

5. In a friction clutch, a hub having a radial flange, a pair of annular spring housing plates, rigidly tied together, receiving said hub and embracing said flange, said plates and flange having registered openings, springs seated in said openings and collectively forming a sectional cushion between said hub and plates, an annular pressure plate encircling said hub, an annular space being defined radially inwardly of said springs and between said flange and one of said housing plates, a spring washer, normally frusto-conical, interposed between said one housing plate and pressure plate and stressed to lie substantially in a flat plane, said washer and pressure plate being coaxial with and received in said annular space, said one housing plate having its inner region offset axially to form a space between said inner region and the body of said spring and to form a fulcrum shoulder against which the outer region of said spring rests.

6. In a friction clutch, a hub having a radial flange, a pair of annular spring housing plates, rigidly tied together, receiving said hub and embracing said flange, said plates and flange having registered openings, springs seated in said openings and collectively forming a sectional cushion between said hub and plates, an annular pressure plate encircling said hub, an annular space being defined radially inwardly of said springs and between said flange and one of said housing plates, a spring washer, normally frusto-conical, interposed between said one housing plate and pressure plate and stressed to lie substantially in a flat plane, said washer and pressure plate being coaxial with and received in said annular space, said pressure plate having its side adjacent said spring relieved to form an outwardly flaring space between said pressure plate and spring.

7. A clutch driven member including a hub and a facing supporting assembly arranged to have limited, relative, angular displacement with the hub through torque transmitting springs, friction elements between the hub and the facing supporting assembly and a sheet metal loading spring having substantially zero deflection rate in its assembled position between the facing supporting assembly and the hub.

8. A clutch driven member including a hub and a facing supporting assembly arranged to have limited, relative, angular displacement relative to the hub through torque transmitting springs, a plurality of friction elements arranged in series between the hub and the facing supporting assembly, said friction elements being subject to a decrease in dimension at right angles to a plane of their friction faces as a result of initial wearing-in, and a sheet metal loading spring having substantially zero deflection rate in its assembled position, interposed between the facing supporting assembly and hub and exerting pressure against said friction elements.

9. A clutch driven member as defined in claim 8, wherein said friction elements and loading spring are each in the form of washers coaxial with the hub and interposed in series with each other between the hub and facing supporting assembly.

10. A clutch driven member as defined in claim 8, wherein said loading spring and friction members are in the form of washers and all arranged coaxial with the hub and wherein said loading spring is stressed to a position of substantial flatness.

HAROLD NUTT.